United States Patent
Kim

(10) Patent No.: US 12,529,090 B2
(45) Date of Patent: Jan. 20, 2026

(54) ANTIBIOTIC SUSCEPTIBILITY EVALUATION APPARATUS

(71) Applicant: THE WAVE TALK, INC., Daejeon (KR)

(72) Inventor: Young Dug Kim, Seongnam-si (KR)

(73) Assignee: THE WAVE TALK, INC., Daejeon (KR)

( * ) Notice: Subject to any disclaimer, the term of this patent is extended or adjusted under 35 U.S.C. 154(b) by 351 days.

(21) Appl. No.: 18/215,601

(22) Filed: Jun. 28, 2023

(65) Prior Publication Data

US 2023/0340560 A1    Oct. 26, 2023

Related U.S. Application Data

(63) Continuation of application No. PCT/KR2021/020209, filed on Dec. 29, 2021.

(30) Foreign Application Priority Data

Dec. 30, 2020  (KR) ................. 10-2020-0188357
Dec. 29, 2021  (KR) ................. 10-2021-0191065

(51) Int. Cl.
| | | |
|---|---|---|
| *C12Q 1/18* | (2006.01) | |
| *G01N 21/17* | (2006.01) | |
| *G01N 21/59* | (2006.01) | |
| *G01N 33/483* | (2006.01) | |

(52) U.S. Cl.
CPC ............. *C12Q 1/18* (2013.01); *G01N 21/59* (2013.01); *G01N 2021/1765* (2013.01); *G01N 2021/178* (2013.01); *G01N 33/483* (2013.01)

(58) Field of Classification Search
None
See application file for complete search history.

(56) References Cited

U.S. PATENT DOCUMENTS

2020/0291447 A1*  9/2020  Marcelpoil ............ G06V 20/69
2023/0340560 A1* 10/2023  Kim ..................... C12Q 1/02

FOREIGN PATENT DOCUMENTS

| | | | |
|---|---|---|---|
| JP | 2016005437 | A | 1/2016 |
| KR | 101686766 | B1 | 12/2016 |
| KR | 102017013856 | A | 12/2017 |
| KR | 1020190013541 | A | 2/2019 |
| KR | 10-2019-0032320 | A | 3/2019 |
| KR | 1020210004870 | A | 1/2021 |
| WO | 99/02645 | A | 1/1999 |
| WO | 2021/006568 | A | 1/2021 |

OTHER PUBLICATIONS

Han et al., "Real-time monitoring of bacterial growth and fast antimicrobial susceptibility tests exploiting multiple light scattering" bioRxiv, doi: https://doi.org/10.1101/481184, Nov. 29, 2018.
International Search Report of PCT/KR2021/020209 dated Apr. 14, 2022.
Gilles Hejblum et al., Automated Interpretation of Disk Diffusion Antibiotic Susceptibility Tests with the Raidal Profile Analysis Algorithm (Journal of Clinical Microbiology, Sep. 1993).
SeugnYun Han et al, Rapid antimicrobial susceptibilty test using spatiotemporal analysis of laser speckle dynamics of bacterial colonies.
Ilya Balmages et al, Laser speckle time-series correlation analysis for bacteria activity detection (Apr. 1, 2020).

* cited by examiner

*Primary Examiner* — Blaine Lankford
(74) *Attorney, Agent, or Firm* — Dinsmore & Shohl LLP; Yongsok Choi, Esq.

(57) ABSTRACT

Provided is an antibiotic susceptibility evaluation apparatus including a sample unit including a sample and at least an antibiotic disk arranged on the sample, a light source radiating coherent light to the sample unit, an image sensor detecting transmitted light passing through the sample unit to obtain a sample image, and a controller configured to receive a first sample image, which is an image of the sample at an initial time when the antibiotic disk is arranged on the sample unit, and a second sample image, which is an image of the sample after a preset time, to obtain a spatial correlation of an interference pattern between the first sample image and the second sample image, and to evaluate susceptibility of the sample to antibiotics based on the spatial correlation according a position.

5 Claims, 7 Drawing Sheets

ANTIBIOTIC SUSCEPTIBILITY EVALUATION APPARATUS

CROSS-REFERENCE TO RELATED APPLICATIONS

The present application is a continuation of International Application No. PCT/KR2021/020209, filed on Dec. 29, 2021, which claims the benefit of Korean Patent Application No. 10-2020-0188357 filed on Dec. 30, 2020 and Korean Patent Application No. 10-2021-0191065 filed on Dec. 29, 2021 in the Korean Intellectual Property Office, the entire disclosure of each of which is incorporated herein by reference.

TECHNICAL FIELD

Embodiments of the present disclosure relate to an evaluation for antibiotics susceptibility.

BACKGROUND ART

A colony counting method and a disk diffusion method are generally used as a method of measuring the antimicrobial activity of a sample. The colony counting method is a method of measuring the antimicrobial activity of the sample in such a manner that a microbial solution having the microorganisms reacted with the sample for a certain time is painted out on a nutrient agar to grow the microorganisms for a certain time and the antimicrobial activity of the sample is measured by using the clustering coefficient of the grown microorganisms, to thereby obtain quantitative measurement results.

In contrast, the disk diffusion method is a method of measuring the size of inhibition zone in such a manner that a specimen is placed on a nutrient agar on which some amounts of the microorganisms are painted out to grow the microorganisms for a certain time and the inhibition zone is generated around the sample due to the sample, to thereby obtain qualitative antimicrobial activity results of the sample.

The colony counting method may obtain the quantitative antimicrobial activity measurement results and is widely used in various research fields, however, requires repeated experiments with various dilution ratios for obtaining a measurable clustering coefficient of the microorganisms and times for reacting with the microorganisms and the sample and for growing the reacted microorganisms on the nutrient agar, respectively, which leads to disadvantages in terms of time and cost.

On the other hand, the disk diffusion method is advantageous in terms of evaluate time and evaluate cost as compared with the colony counting method because a certain amount of microorganisms are painted out on a nutrient agar and a sample is placed on the nutrient agar, and thus, the microorganisms are grown on the nutrient agar together with the sample and the reaction between the microorganisms and the sample takes place with the growth of the microorganism.

However, in such a case, there are also problems in that so as to grow the microorganisms enough to visually check the inhibition zone, the culturing of microorganisms necessarily takes about 16-24 hours and as the diameter of the inhibition zone is manually measured by using a ruler or vernier calipers, the measuring results may vary depending on an inspector.

DETAILED DESCRIPTION OF THE DISCLOSURE

Technical Problem

An embodiment of the present disclosure provides an antibiotic susceptibility evaluation apparatus for obtaining a sample image and evaluating antibiotic susceptibility more rapidly by deriving a spatial correlation of interference pattern of the sample image.

Technical Solution to Problem

An embodiment of the present disclosure may disclose an antibiotic susceptibility evaluation apparatus including a sample unit including a sample and at least an antibiotic disk arranged on the sample, a light source radiating coherent light to the sample unit, an image sensor detecting transmitted light passing through the sample unit to obtain a sample image, and a controller configured to receive a first sample image, which is an image of the sample at an initial time when the antibiotic disk is arranged on the sample unit, and a second sample image, which is an image of the sample after a preset time, to obtain a spatial correlation of an interference pattern between the first sample image and the second sample image, and to evaluate susceptibility of the sample to antibiotics based on the spatial correlation according a position.

Advantageous Effects of Disclosure

The antibiotic susceptibility evaluation apparatus according to an embodiment of the present disclosure may evaluate the susceptibility of a sample to antibiotics in a short time without waiting for a sufficient culturing time to generate colonies.

DETAILED DESCRIPTION

Figure 1:
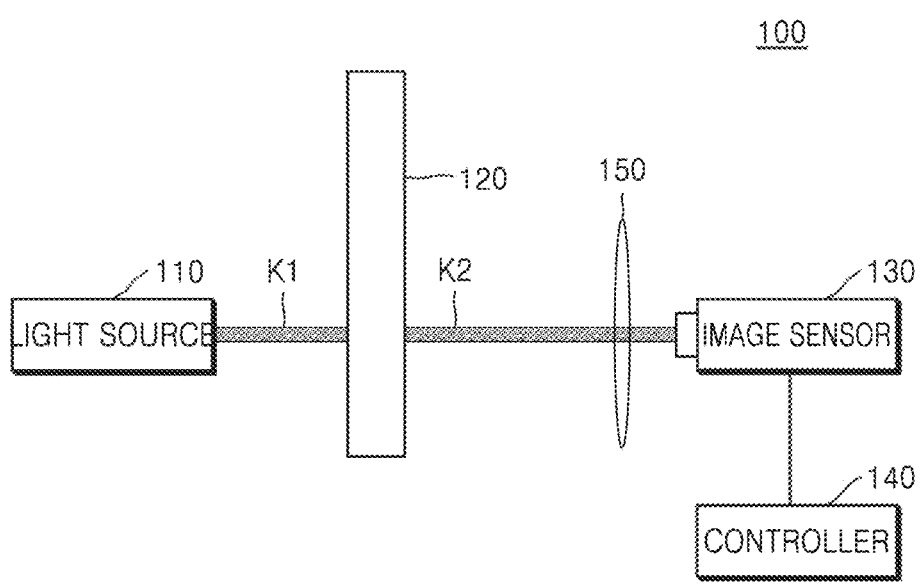
FIG. 1 is a conceptual view schematically illustrating an antibiotic susceptibility evaluation apparatus according to an embodiment of the present disclosure.

An embodiment of the present disclosure provides an antibiotic susceptibility evaluation apparatus including a sample unit including a sample and at least an antibiotic disk arranged on the sample, a light source radiating coherent light to the sample unit, an image sensor detecting transmitted light passing through the sample unit to obtain a sample image, and a controller configured to receive a first sample image, which is an image of the sample at an initial time when the antibiotic disk is arranged on the sample unit 120, and a second sample image, which is an image of the sample after a preset time, to obtain a spatial correlation of an interference pattern between the first sample image and the second sample image, and to evaluate susceptibility of the sample to antibiotics based on the spatial correlation according a position.

In an embodiment of the present disclosure, the antibiotic susceptibility evaluation apparatus may further include a driving unit rotating the sample unit with respect to a rotation axis, and a plurality of antibiotic disks may be arranged radially with a center at which the rotation axis is positioned.

In an embodiment of the present disclosure, the image sensor may obtain a plurality of sample images of areas around the antibiotic disks while the sample unit is rotated by the driving unit.

In an embodiment of the present disclosure, a center of the light irradiated from the light source may be located at a position spaced apart from the rotational axis.

In an embodiment of the present disclosure, the controller may be configured to calculate a diameter of an inhibition zone of a specified antibiotic disk using a distance to a point at which a resultant value of the spatial correlation corresponds to a preset threshold and to evaluate the susceptibility of the sample to antibiotics using the calculated diameter of the inhibition zone.

In an embodiment of the present disclosure, the controller may be configured to store information on the antibiotic disk, information on the sample, and reference information for evaluating antibiotic susceptibility, to correct the calculated diameter of the inhibition zone by using the information on the antibiotic disk, the information on the sample, and the reference information for evaluating the antibiotic susceptibility, and to evaluate the susceptibility of the sample to antibiotics using the corrected diameter of the inhibition zone.

Other aspects, features and advantages other than the described above will be apparent from the following drawings, claims and detailed description of the present disclosure.

Mode of Disclosure

Hereinafter, embodiments of the present disclosure are described in detail with reference to the accompanying drawings, and the same reference numerals denote the same or corresponding elements and repeated descriptions on the same elements are omitted when describing with reference to the drawings.

Since the present embodiments may be modified variously, some embodiments are illustrated in the drawings and described in detail in the detailed description. Effects and features of the present disclosure and methods of achieving the same are apparent with reference to embodiments described below in detail with reference to the drawings. However, the present disclosure is not limited to the embodiments disclosed below and may be implemented in various forms.

In the following embodiments, terms such as first and second are used for the purpose of distinguishing one element from another element without limiting meaning.

In the following embodiment, a singular expression includes a plural expression unless it is explicitly meant differently in the context.

In the following embodiments, the term 'include' or 'have' means that a feature or a component described in the specification exists, and the possibility of adding one or more other features or components is not excluded in advance.

In the following embodiment, when a part such as a unit, a region, a component, etc. is on or above another part, it includes not only a case directly on the other part, but also a case where another unit, region, component, etc. is interposed therebetween.

In the following embodiments, the term such as 'connect' and 'couple' do not necessarily mean direct and/or fixed connection or coupling of two members unless the context clearly indicates otherwise, and do not exclude that another member is interposed between the two members.

It means that the features or elements described in the present disclosure exist, and the possibility of adding one or more other features or elements is not excluded in advance.

In the drawings, the size of elements may be exaggerated or reduced for convenience of description. For example, since the size and thickness of each element shown in the drawings are arbitrarily shown for convenience of description, the present disclosure is not necessarily limited to the illustrated.

Figure 2:
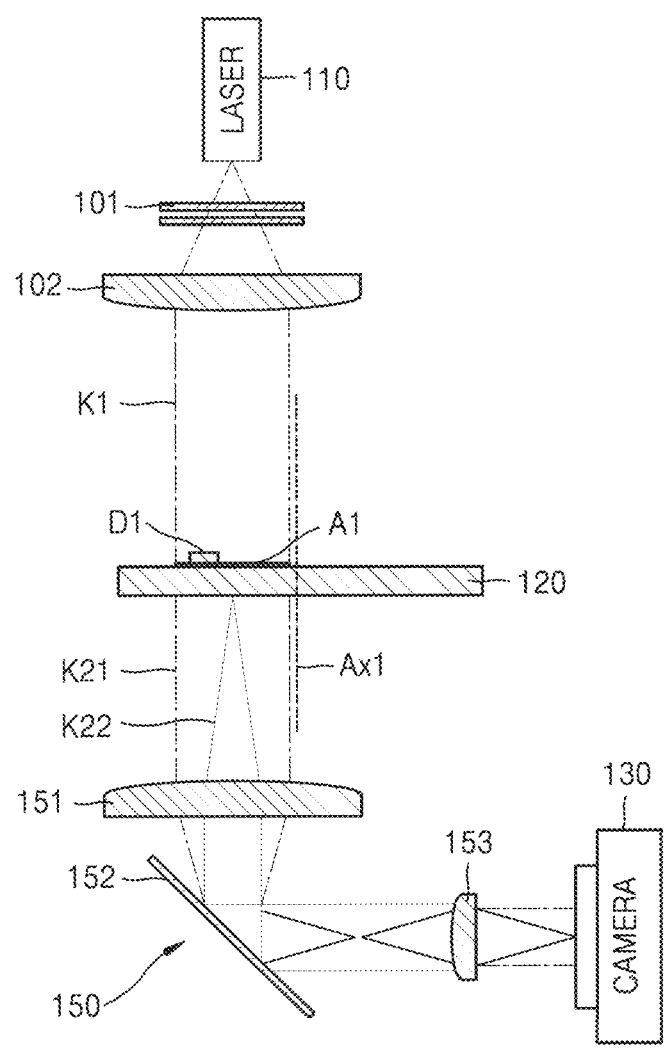
FIG. 2 is a view for explaining elements of the antibiotic susceptibility evaluation apparatus in FIG. 1.
Figure 3:
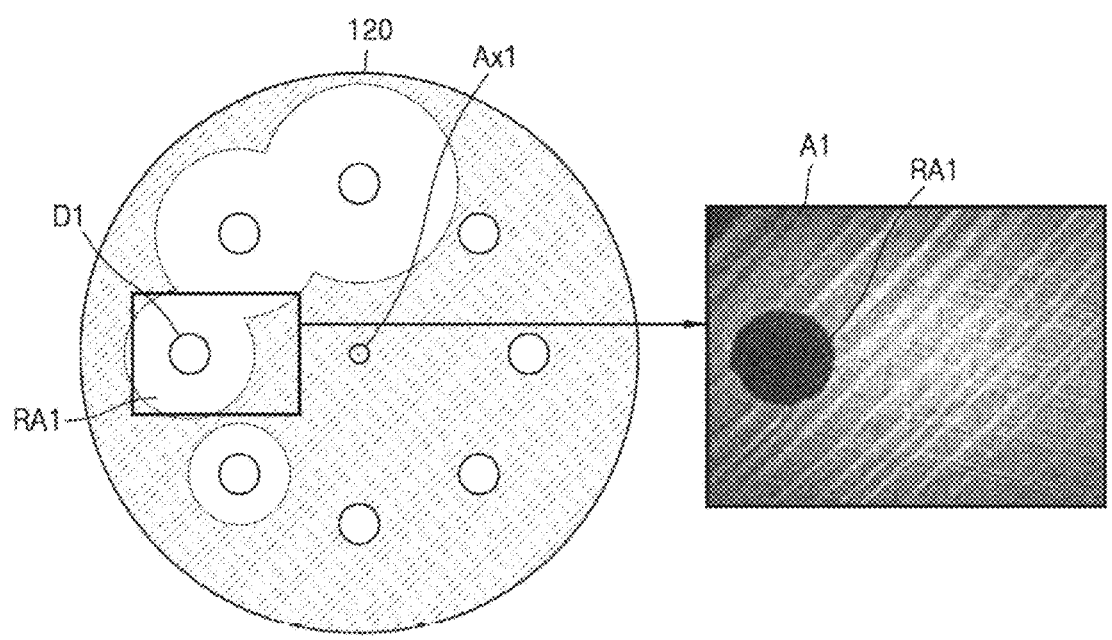
FIG. 3 is a view for explaining the sample unit in FIG. 2.

FIG. 1 is a conceptual view schematically illustrating an antibiotic susceptibility evaluation apparatus 100 according to an embodiment of the present disclosure, FIG. 2 is a view for explaining elements of the antibiotic susceptibility evaluation apparatus 100 in FIG. 1, and FIG. 3 is a view for explaining the sample unit 120 in FIG. 2.

Referring to FIGS. 1 to 3, an antibiotic susceptibility evaluation apparatus 100 according to an embodiment of the present disclosure may include a light source 110, a sample unit 120, an image sensor 130, and a controller 140.

The antibiotic susceptibility evaluation apparatus 100 according to embodiments of the present disclosure may be aimed for determining a specific antibiotic that is effective in stopping the growth of a specific bacteria (pathogenic microorganism) which causes infection and may have a technical concept of determining antibiotic susceptibility by applying an antibiotic to a sample containing bacteria and analyzing a sample image obtained by irradiating light to the sample.

The light source 110 may radiate coherent light to the sample unit 120 including the sample. Herein, the light source 110 may include all types of source devices capable of generating light and may be a laser capable of irradiating light of a specific wavelength band.

Herein, the light source 110 may use a laser having good coherence to form a speckle, which is an interference pattern, on the sample. In this case, as the spectral bandwidth of the light source, which determines the coherence of the laser light source, is short, the measurement accuracy may be increased.

That is, as the coherence length increases, the measurement accuracy may increase. Accordingly, a laser light having a spectral bandwidth of the light source 110 less than a predefined reference bandwidth may be used as the light source 110, and the measurement accuracy may increase as the spectral bandwidth of the light source 110 is shorter than the reference bandwidth. For example, the spectral bandwidth of the light source may be set in such a way that the condition of Equation 1 below is satisfied.

$$\text{spectral bandwidth} < 5 \text{ nm} \qquad [\text{Equation 1}]$$

According to Equation 1, when light is irradiated to the sample unit 120 for measuring pattern changes of a laser speckle, the spectral bandwidth of the light source 110 may be maintained to be less than 5 nm.

In addition, when the antibiotic susceptibility evaluation apparatus 100 irradiates the light generated from the light source 110 to the sample unit 120, the characteristic of the light needs to be improved to increase analysis accuracy. To this end, the antibiotic susceptibility evaluation apparatus 100 may include one or more optical means between the light source 110 and the sample unit 120. For example, the optical means may include one or more polarizers 101, collimation lenses 102, etc.

Meanwhile, the light source 110 may be located on a position spaced apart from a central axis Ax1 of the sample unit 120. In other words, the light source 110 may irradiate light to the sample unit 120 in such a way that the light is irradiated onto an area A1 deviated from the center of the sample unit 120.

The sample unit 120 may receive the sample to be tested, and one or more antibiotic disks D1 positioned on the sample may be applied. The sample unit 120 may include any types of containers for receiving the sample, and may be, for example, an agar plate containing a culture solution for culturing microorganisms.

The sample may be a pathogenic microorganism and may be painted out on the agar plate including the culture solution and be received in the sample unit 120. The antibiotic disk D1 may include an antibiotic that is expected to react to the corresponding pathogenic microorganism and may be positioned on the sample unit 120 receiving the sample.

In the sample unit 120, the antibiotic disk D1 may be located at a position spaced a certain distance from the central axis Ax1 of the sample unit 120. The antibiotic disk D1 may be positioned in an area A1 onto which the light source 110 irradiates light.

When the sample unit 120 includes a plurality of antibiotic disks D1, the plurality of antibiotics disks D1 may be radially positioned with respect to the central axis Ax1 of the sample unit 120.

Meanwhile, although not shown in the drawing, the antibiotic susceptibility evaluation apparatus 100 may further include a driving unit (not shown) for rotating the sample unit 120. Herein, since the sample unit 120 may rotate with respect to the central axis Ax1, the central axis Ax1 and the rotation axis are used interchangeably for description hereinafter.

The sample unit 120 may be rotated around the rotation axis Ax1 by the driving unit (not shown). Since the sample unit 120 rotates while the light source 110 and the image sensor 130 may be fixed in a certain position, sample images for a plurality of antibiotic disks D1 may be quickly obtained.

The plurality of antibiotic disks D1 may be arranged on the sample unit 120 in such a way that the antibiotic disks D1 are spaced apart from each other in a radial direction with respect to the rotation axis Ax1 of the sample unit 120, and a gap distance between the neighboring antibiotic disks D1 may be determined in consideration of the size of an inhibition zone RA1. Since the size of the inhibition zone RA1 may be predicted according to a preset reading criterion (e.g., USA: CLSI, Europe: EUCAST), the plurality of antibiotic disks D1 may be arranged to be spaced apart from each other based on the size of the inhibition zone RA1.

However, the antibiotic disks D1 may not be necessarily spaced apart by the maximal size of the inhibition zone, and thus, may be arranged in consideration of partial overlaps. As shown in the drawings, this is because the antibiotic disks D1 do not overlap in the radial direction that is directed from the antibiotic disk D1 to the rotation axis Ax1 even though the antibiotic disks D1 are partially overlapped in an arrangement direction.

The image sensor 130 may be positioned on a path of light emitted from the sample unit 120, and thus, obtain a sample image which is an optical image photographed by light. The image sensor 130 may detect transmitted light K2 passing through the sample unit 120, to thereby obtain the sample image. For example, the image sensor 130 may be a charge-coupled device (CCD) camera. The image sensor 130 may measure the optical image photographed by light emitted from the sample unit 120 and transmit the optical image to the controller 140.

The antibiotic susceptibility evaluation apparatus 100 according to an embodiment of the present disclosure may further include a lens unit 150 between the image sensor 130 and the sample unit 120. Herein, the lens unit 150 may include one or more lenses 151 and 153 and may further include an optical component such as a mirror 152.

The antibiotic susceptibility evaluation apparatus 100 may implement an effect of shortening a measurement distance z between the image sensor 130 and the sample unit 120 by using the lens unit 150, to thereby perform an early detection.

At this time, assuming that the lens unit 150 includes a single lens, the focal distance f of the lens is expressed as ab/(a+b) and the magnification M of the lens is expressed as a/b, where a is a distance between the lens and the image sensor 130 and b is a distance between the lens and a virtual image of the image sensor 130.

For example, assuming that a width of the observation area A1 for observing the sample is greater than 30 mm and the size (radius, w) of colony that is observable by the present evaluation apparatus 100 is greater than 20 μm (based on coliform *bacillus* (*E. coli*) culturing for 4 hours), a pixel size p of the image sensor 130 may have the following relational expression based on the Nyquist-shannon Sampling theorem.

$$\frac{2p}{M} < w \qquad \text{[Equation 2]}$$

Meanwhile, the antibiotic susceptibility evaluation apparatus 100 may determine a propagation distance z that is a distance from the sample unit 120 to the virtual image of the image sensor 130. At this time, assuming that the sample is a thin and transparent disk, the sample to be measured may be characterized by a radius w that is a size of the sample, a thickness h, and a refractive index n. Since the propagation distance z is much longer than the size of the sample, the Fraunhofer approximation may be applied.

Herein, the final interference pattern may appear as an interference pattern between an object wave K22, which is a diffraction pattern by the sample, and a reference wave K21 transmitted after irradiating from the light source 110 to the sample unit 120 and may be shown in an airy pattern.

For the above conditions, the intensity of the interference pattern is expressed on a polar coordinate system as follows.

$$I(r) = \left| e^{jkz} e^{j\frac{kr^2}{2z}} \frac{\pi w^2}{j\lambda z} \left[ 2 \frac{J_1(kwr/z)}{kwr/z} \right] + e^{jkhn} \right|^2 \qquad \text{[Equation 3]}$$

At this time, since $$\left[ 2 \frac{J_1(kwr/z)}{kwr/z} \right]$$

has a maximum value of 1 when r equals to 0, the above equation is expressed again as follows.

$$I(0) = \left| e^{jkz}\frac{\pi w^2}{j\lambda z} + e^{jkhn} \right|^2 \quad \text{[Equation 4]}$$

$$= \left| \left( \cos(khn) + \frac{\pi w^2}{\lambda z}\sin(kz) \right) + j\left( \sin(khn) - \frac{\pi w^2}{\lambda z}\cos(kz) \right) \right|^2$$

$$= 1 + \frac{\pi^2 w^4}{\lambda^2 z^2} + \frac{2\pi w^2}{\lambda z}\sin(k(z-hn))$$

Equation 4 shows that the signal intensity decreases as the propagation distance z increases, and the signal intensity increases as the sample size w increases. When the thickness h of the sample is almost equal to the wavelength λ (about 0.5 μm), l(r) becomes a maximal value when r equals to zero. In general, since an analog signal noise ratio (SNR) of 6 dB is converted to 1-bit when being digitized, the propagation distance z may be determined as a distance satisfying a condition in which the maximal value of l(r) is greater than the 6 dB SNR of the image sensor 130.

The controller 140 may evaluate the antibiotic susceptibility of the sample using the sample image (see FIG. 3) obtained by the image sensor 130. Specifically, the controller 140 may receive a first sample image that is an initial image when the antibiotic disk D1 is positioned on the sample unit 120 and a second sample image that is an image after a preset time passes, obtain the spatial correlation of the interference pattern between the first sample image and the second sample image, and evaluate the susceptibility of the sample to the antibiotic based on the spatial correlation according to a position. Detailed descriptions on the antibiotic susceptibility evaluate using the spatial correlation in the controller 140 are described below.

Figure 4A:
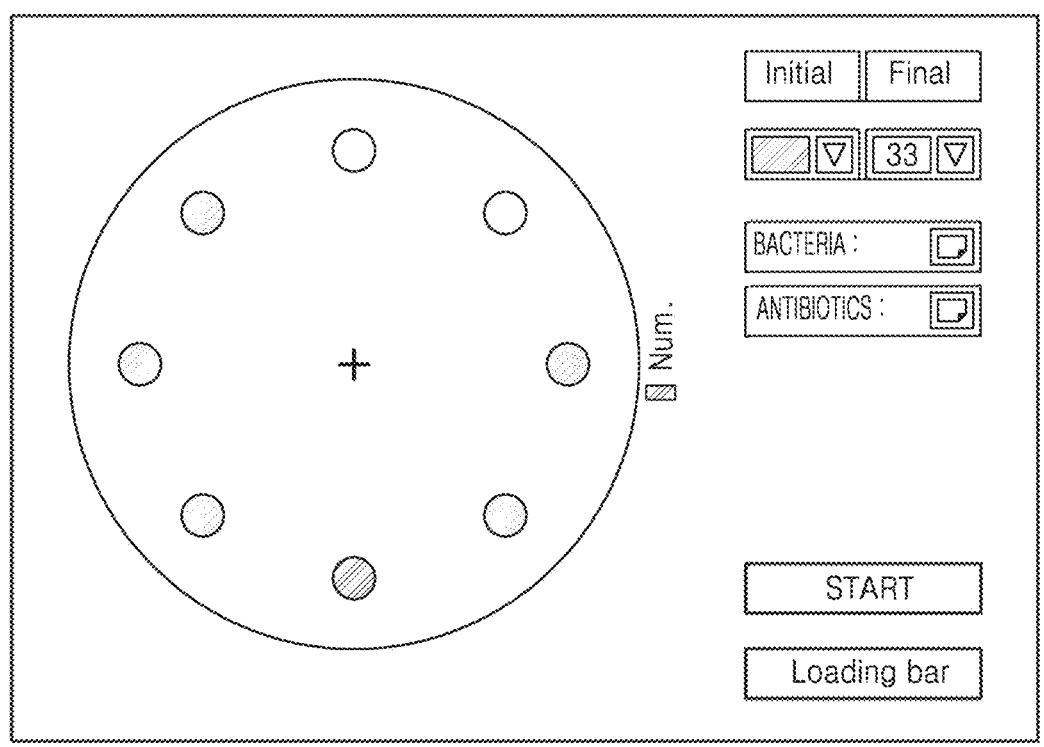
FIGS. 4A and 4B are example views illustrating a measurement screen of an antibiotic susceptibility evaluation apparatus according to an embodiment of the present disclosure.
Figure 4B:
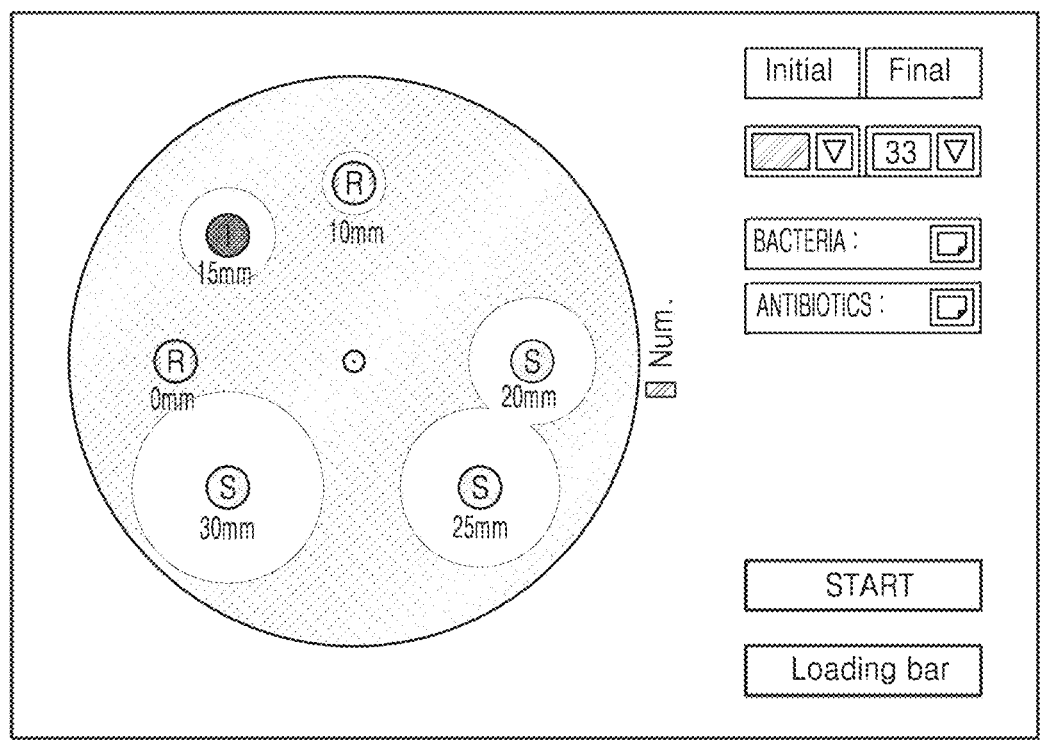
Figure 5:
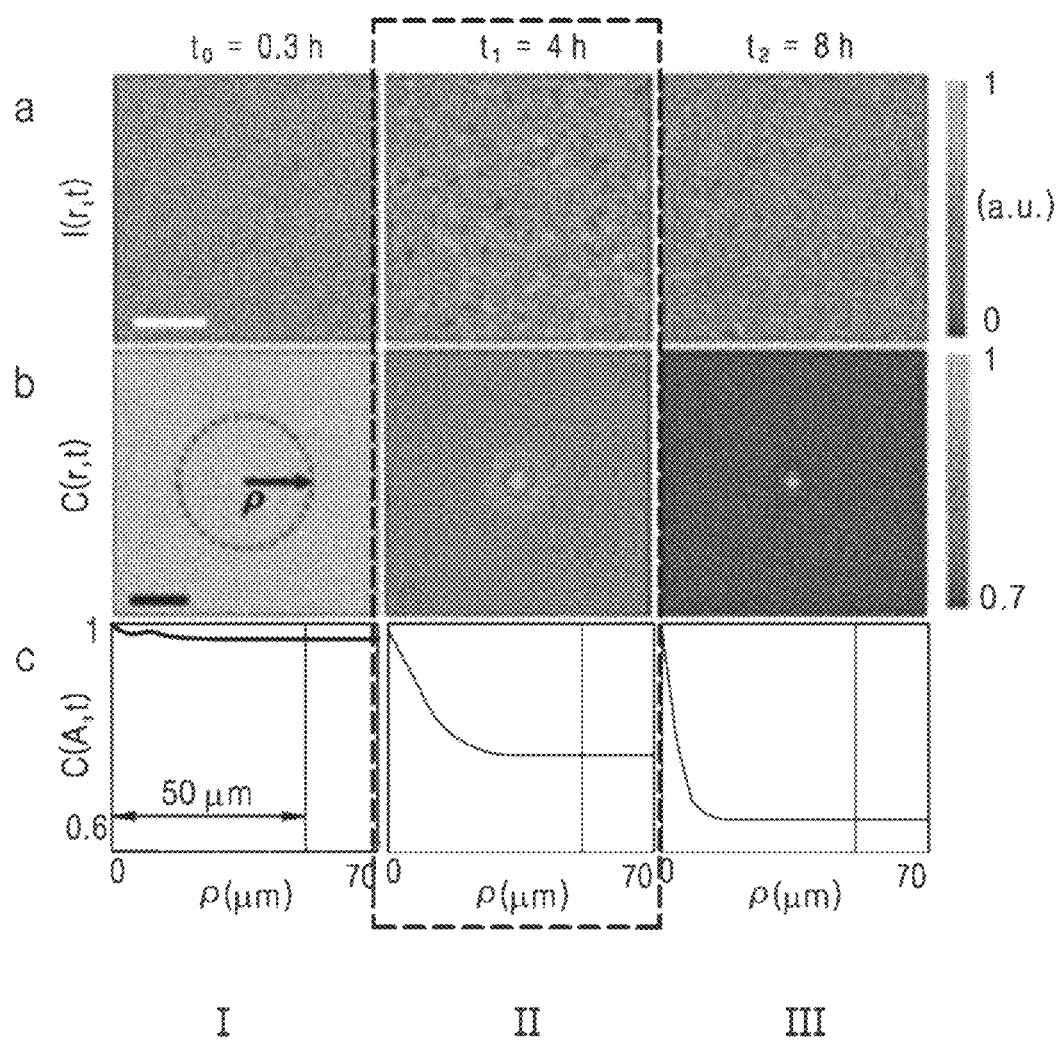
FIGS. 5 and 6 are views for describing a principle of evaluating the antibiotic susceptibility using the spatial correlation of sample images in the controller.
Figure 6:
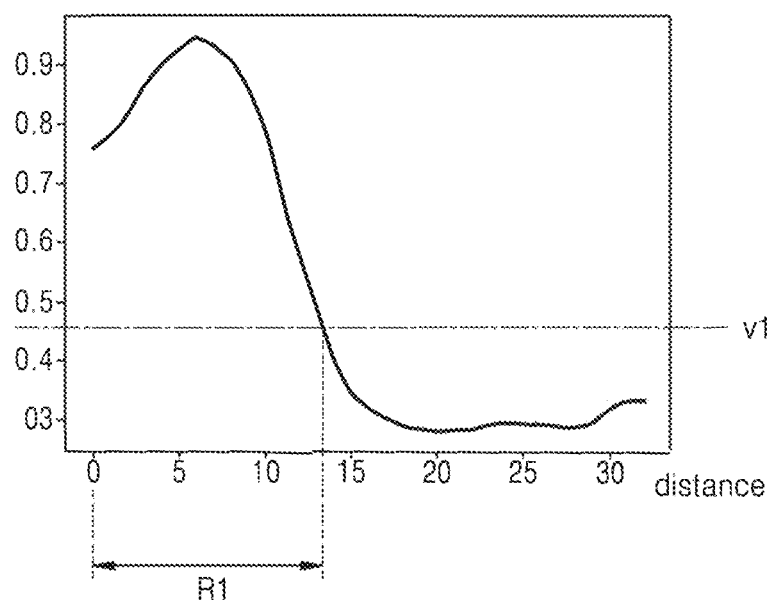

FIGS. 4A and 4B are example views illustrating a measurement screen of the antibiotic susceptibility evaluation apparatus 100 according to an embodiment of the present disclosure, and FIGS. 5 and 6 are views for describing a principle of evaluating the antibiotic susceptibility using the spatial correlation of sample images in the controller.

Referring to FIG. 4A, the antibiotic susceptibility evaluation apparatus 100 may further include an input/output interface, for example, a touch display unit (not shown). The display unit (not shown) may obtain information on the samples from a user and provide measurement results to the user.

At this time, the display unit (not shown) may display the sample image captured by the image sensor 130 on the screen. However, as described above, the sample image may be an image obtained by measuring only a certain area including the antibiotic disk D1 on the sample unit 120. In another embodiment, the display unit (not shown) may display a sample unit image obtained by capturing the entire sample unit 120. To this end, the antibiotic susceptibility evaluation apparatus 100 may further include a camera for capturing an entire image of the sample unit 120 as well as the image sensor 130.

In an embodiment, the antibiotic susceptibility evaluation apparatus 100 may receive information on the sample and information on the antibiotic disk applied to the sample by the input/output interface. In addition, the antibiotic susceptibility evaluation apparatus 100 may receive reference information for evaluating the antibiotic susceptibility. For example, the reference information for the antibiotic susceptibility evaluate may be a preset reading criterion (e.g., USA: CLSI, Europe: EUCAST).

When the user prepares the sample unit 120 including the sample and the antibiotic disk in the antibiotic susceptibility evaluation apparatus 100, the antibiotic susceptibility evaluation apparatus 100 may obtain the first sample image of the sample unit 120 at first. The antibiotic susceptibility evaluation apparatus 100 may obtain the initial first sample image as a single image or a plurality of images that are sequentially captured in time order.

Referring to FIG. 4B, the antibiotic susceptibility evaluation apparatus 100 may obtain the second sample image after a preset time passes. Herein, the preset time is a growing time in which the sample grows enough to derive meaningful results in the antibiotic susceptibility evaluation apparatus 100, and may be, for example, about 4 to 6 hours. However, the present disclosure is not limited thereto, and the preset time may vary depending on the type of sample, and the time may be reduced according to development. However, the preset time disclosed above may be much shorter than the time required for visual confirmation by the conventional disk diffusion method (e.g., about 16 to 24 hours), and the antibiotic susceptibility evaluation apparatus 100 according to an embodiment of the present disclosure may have an advantage that the antibiotic susceptibility evaluate is performed in a shorter time compared to conventional techniques.

When the preset time has passed, as shown in FIG. 4B, the inhibition zones RA1 and RA2 may be formed in the sample by the antibiotic disks D1 and D2. The sizes of the inhibition zones RA1 and RA2 may vary depending on the type of sample and the type of antibiotics.

A plurality of antibiotic disks D1 and D2 may be applied to the sample unit 120, and, so as to evaluate the susceptibility from each of the antibiotic disks D1 and D2, the antibiotic susceptibility evaluation apparatus 100 may rotate the sample unit 120 and capture the second image for each of the antibiotic disks D1 and D2. The same method as described above may be applied when obtaining the first sample image at first time.

Referring to FIGS. 5 and 6, the controller 140 may receive the first sample image that is an image at an initial time when the antibiotic disks D1 and D2 are arranged on the sample unit 120 and the second sample image after the preset time passes from the image sensor 130. The controller 140 may obtain the spatial correlation of the interference patterns between the first sample image and the second sample image and evaluate the susceptibility of the sample to the antibiotic based on the spatial correlation according to a position.

Specifically, when the colony is not sufficiently grown, most of the light that is incident on the sample unit 120 is emitted out of the sample unit because there is no diffusion medium, but when the colony sufficiently grows, the light that is incident on the sample unit 120 is scattered from the colonies to thereby form the interference pattern. At this time, when the antibiotic disks D1 and D2 are applied to the sample, the interference pattern may be greatly changed at the boundaries of the inhibition zones RA1 and RA2 that are formed by the antibiotics.

The controller 140 may obtain the spatial correlation of the interference pattern. Herein, the spatial correlation given by the following equation may be expressed as a number in a certain range that indicates how much brightness of an arbitrary pixel is similar to that of a pixel spaced apart from the arbitrary pixel by a distance r on an image captured at time t.

The certain range may be in a range of −1 to 1. That is, the spatial correlation indicates a degree of correlation between an arbitrary pixel and another pixel, and 1 indicates a positive correlation, −1 indicates a negative correlation, and 0 indicates no correlation. Specifically, since the brightness is emitted uniformly before the interference pattern is formed, the spatial correlation of the sample image shows a positive correlation close to 1, but after the interference pattern is formed, the value of the correlation may decrease in a direction close to 0.

In the image sensor 130, the brightness of a pixel at the position of r'=(x, y) detected at time t may be defined as l(r', t), and the brightness of the pixel spaced apart by r may be defined as l(r'+r, t). Based on the definition described above, the spatial correlation may be expressed as following Equation 5.

$$C(r, t) = \frac{1}{C_0(t)} \int \int I(r' + r, t)I(r', t)dr' \quad \text{[Equation 5]}$$

$C_0(t)$ is used to adjust Equation 7 in a range of −1 to 1. When the brightness l(r', t) of an arbitrary pixel at time t is the same as the brightness l(r'+r, t) of a pixel spaced apart from the arbitrary pixel by a distance r, the spatial correlation may be derived by 1, otherwise the spatial correlation may have a value less than 1.

In an embodiment, the present disclosure may express the above-mentioned spatial correlation only as a function of time. Thus, the controller 140 may obtain an average of the spatial correlations for various pixels spaced apart from an arbitrary pixel by the same distance r by using Equation 6 below (see b in FIG. 5).

$$C(\rho, t) = \frac{1}{2\pi} \int_0^{2\pi} C(r, t)d\theta \quad \text{[Equation 6]}$$

In an embodiment, the controller 140 may substitute the variable r in Equation 6 with a preset distance to make Equation 6 a function of time, and then, may check the degree of interference pattern formation as a value in a certain range of 0 and 1 by using the function.

The controller 140 may distinguish the inhibition zones RA1 and RA2 from the sample image by a pattern change of the sample image over time. Specifically, the controller 140 may distinguish edge areas of the inhibition zones RA1 and RA2 by the pattern change of the sample image over time.

Two identical superimposed images may be generated by using a single image and one of the two identical images may be shifted by a preset distance in a direction, and then, it is analyzed how much a pair of pixels, which are adjacent to each other in the shifted image and an unshifted image, are similar to each other, to thereby obtain the spatial correlation. Herein, the spatial correlation may function as a criterion for indicating how uniform the images are, and thus, when the interference pattern is generated by the colonies, the similarity of two adjacent pixels decreases due to the shabby interference pattern and the value of the spatial correlation is also decreased.

The spatial correlation coefficient may vary according to the shifted distance r, and more particularly, the spatial correlation coefficient decreases as the shifted distance r increases in a certain distance range and when the shifted distance r exceeds the certain distance range, the spatial correlation coefficient has a substantially constant value. Accordingly, in order to obtain a more meaningful spatial correlation, the controller 140 may obtain the spatial correlation from images that are shifted from each other over a preset distance. At this time, the preset distance r may depend on the speckle size, and the controller 140 may obtain the spatial correlation by shifting the image by a distance corresponding to some pixels larger than the speckle in a pixel unit. For example, the preset distance may be a distance of at least 3 pixels or more.

When the sample includes microorganisms growing with time, the concentration of the microorganism increases as time passes and the spatial correlation coefficient may be changed more greatly even when the microorganisms are shifted by the same distance r. Therefore, the antibiotic susceptibility evaluation apparatus 100 according to an embodiment of the present disclosure may quickly evaluate the antibiotic susceptibility due to the analysis of the spatial correlation coefficient without waiting for the culturing time until which the microorganisms are cultured and formed into visually shown colonies.

As shown in FIG. 6, the controller 140 may obtain the spatial correlation coefficient in relation with the distance by the same method as described above and evaluate the susceptibility of the sample to the antibiotic by using the spatial correlation coefficient. In an embodiment, the controller 140 may calculate diameters of the inhibition zones RA1 and RA2 of the corresponding antibiotic disks D1 and D2 by using a distance R1 to a point corresponding to the preset threshold value v1 and evaluate the susceptibility of the sample to antibiotics by using the calculated diameters of the inhibition zones RA1 and RA2.

The threshold value v1 is a preset value and may function as a reference value for determining a point where the spatial correlation coefficient rapidly changes as edge areas of the inhibition zones RA1 and RA2. The threshold value v1 may vary depending on the type of antibiotics or the sample and may also have different values depending on time.

At this time, the controller 140 may correct the diameters of the calculated inhibition zones RA1 and RA2 by using the information on the antibiotic disks D1 and D2, the information on the samples, and the reference information for evaluating the antibiotic susceptibility. In other words, when a specific antibiotic is applied to a sample that is known in advance, the size of the inhibition zone is to be identical or similar to the reference information for evaluating the antibiotic susceptibility However, when the reference information is applied, since there are many cases that the reference information is determined with the naked eye, the size of the inhibition zone may be slightly different from the actual measuring result.

When the diameters of the inhibition zones RA1 and RA2 are different from the reference information, the controller 140 may correct the diameters of the inhibition zones RA1 and RA2 based on the reference information. The controller 140 may receive and store the reference information additionally.

In another embodiment, the controller 140 may learn reference information for classifying the size of the inhibition zone based on the information on the antibiotic disks D1 and D2 and the information on the sample. The controller 140 applies the information on the antibiotic disk D1 and D2 and the information on the sample to a neural network model to learn the reference information for classifying the sizes of the inhibition zones RA1 and RA2, and automatically correct the size of the inhibition zones RA1 and RA2 according to the reference information.

The neural network model may be learned using any one of deep neural networks (DNN), convolutional neural networks (CNN), recurrent neural network (RNN), and deep belief networks (DBN).

The controller 140 may derive the sizes of the inhibition zones RA1 and RA2 using the learned reference information and evaluate the susceptibility of the sample to antibiotics using the derived data of the inhibition zones RA1 and RA2.

The controller 140 may be a processor configured to process commands of a computer program by performing basic arithmetic, logic, and input/output operations. The command may be provided to the controller 140 by a memory or a communication unit. For example, the controller 140 may be configured to execute the received commands according to program codes stored in a recording device such as a memory. Herein, the term 'processor' may include, for example, a data processing device embedded in a hardware having a physically structured circuit for performing a function represented by a code or a command in a program.

An example of the data processing device embedded in the hardware may include a microprocessor, a central processing unit (CPU), a processor core, a multiprocessor, an application-specific integrated circuit (ASIC), a field programmable gate array (FPGA), etc., but is not limited thereto.

As described above, the antibiotic susceptibility evaluation apparatus according to embodiments of the present disclosure may evaluate the susceptibility of a sample to antibiotics in a short time without waiting for the culturing time when the colonies are sufficiently generated.

So far, a preferred embodiment of the present disclosure has been described. Those skilled in the art to which the present disclosure belongs will understand that the present disclosure may be implemented in a modified form without departing from the essential characteristics of the present disclosure. Therefore, the disclosed embodiments should be considered from a descriptive point of view rather than a limiting point of view. The scope of the present disclosure is shown in the claims rather than the above description, and all differences within the equivalent scope should be construed as being included in the present disclosure.

INDUSTRIAL APPLICABILITY

According to an embodiment of the present disclosure, an antibiotic susceptibility evaluation apparatus is provided. In addition, the embodiments of the present disclosure may be applied to a microorganism detection device that is used industrially.

The invention claimed is:

1. An antibiotic susceptibility evaluation apparatus comprising:
a sample unit accommodating a sample and one or more antibiotic disks arranged on the sample;
a light source radiating coherent light to the sample unit;
an image sensor detecting transmitted light passing through the sample unit to obtain a sample image;
a controller configured to:
receive a first sample image at an initial time when the one or more antibiotic disks are arranged on the sample unit, and a second sample image after a preset time;
obtain a spatial correlation of interference patterns of the first sample image and the second sample image; and
evaluate susceptibility of the sample to antibiotics based on the spatial correlation according to a position; and
a driving unit rotating the sample unit with respect to a rotation axis,
wherein when a number of the one or more antibiotic disks is 2 or more, the one or more antibiotic disks are arranged radially with a center at which the rotation axis is positioned.

2. The antibiotic susceptibility evaluation apparatus of claim 1, wherein
the image sensor obtains a sample image of a certain area in which the one or more antibiotic disks are positioned while the sample unit is rotated by the driving unit.

3. The antibiotic susceptibility evaluation apparatus of claim 1, wherein
a center of the coherent light irradiated from the light source is located at a position spaced apart from the rotational axis.

4. The antibiotic susceptibility evaluation apparatus of claim 1, wherein the controller is configured
to calculate a diameter of an inhibition zone of a corresponding antibiotic disk using a distance to a point at which a resultant value of the spatial correlation corresponds to a preset threshold, and
to evaluate the susceptibility of the sample to antibiotics using the calculated diameter of the inhibition zone.

5. The antibiotic susceptibility evaluation apparatus of claim 4, wherein the controller is configured to:
store information on the one or more antibiotic disks, information on the sample, and reference information for evaluating antibiotic susceptibility;
correct the calculated diameter of the inhibition zone by using the information on the one or more antibiotic disks, the information on the sample, and the reference information for evaluating the antibiotic susceptibility; and
evaluate the susceptibility of the sample to antibiotics using the corrected diameter of the inhibition zone.

* * * * *